C. DE LUKACSEVICS.
INTERNAL COMBUSTION ENGINE.
APPLICATION FILED APR. 30, 1920.
1,377,898.
Patented May 10, 1921.
6 SHEETS—SHEET 5.
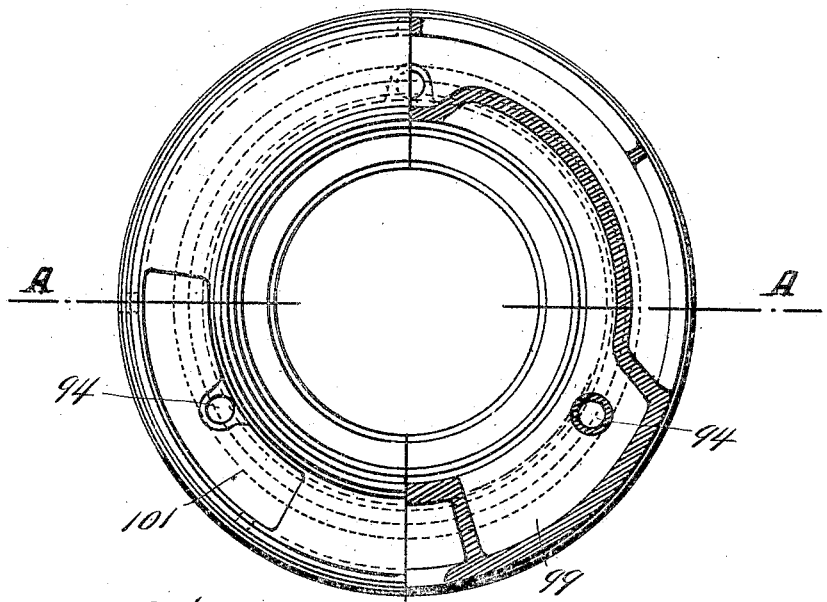
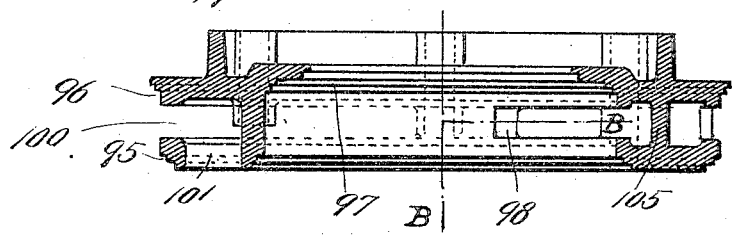

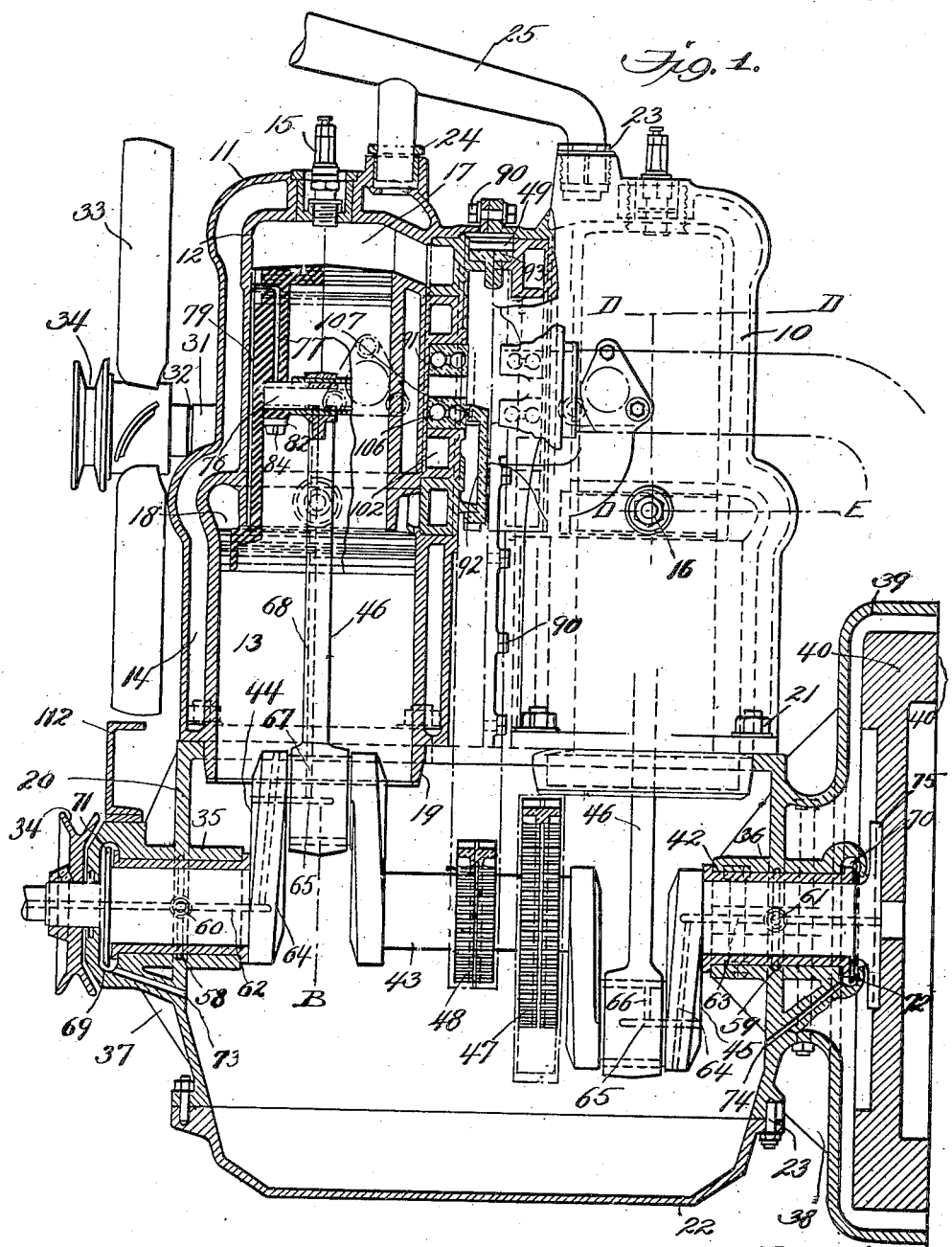

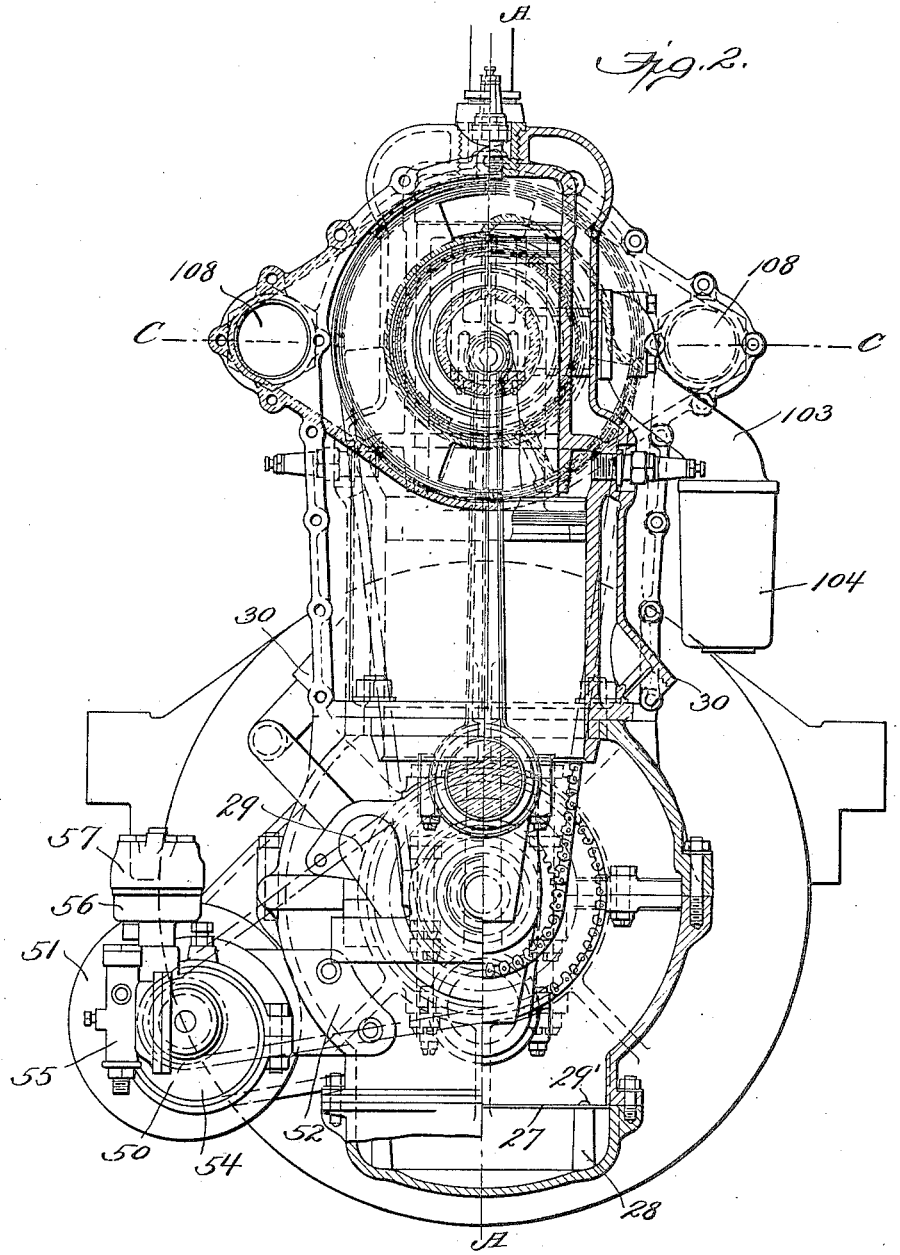

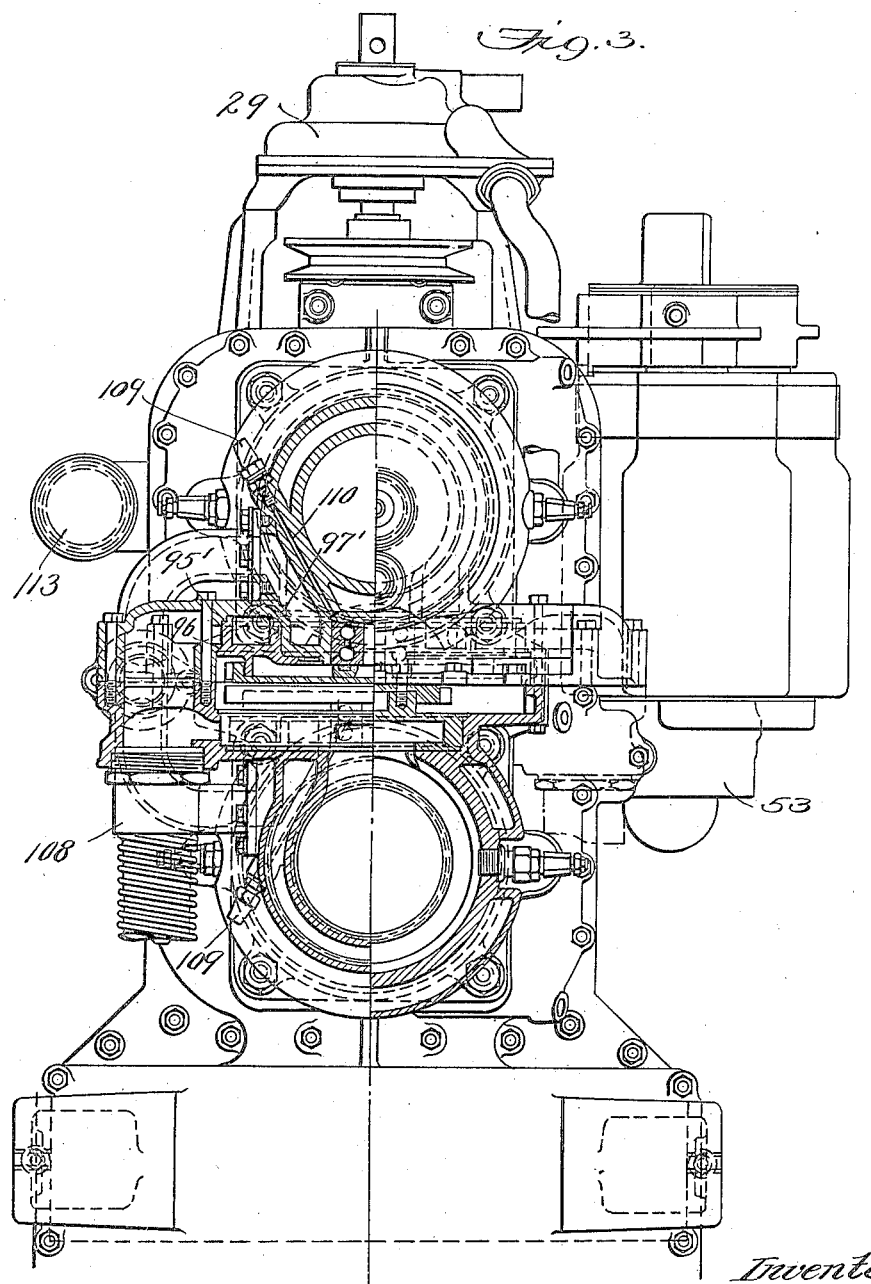

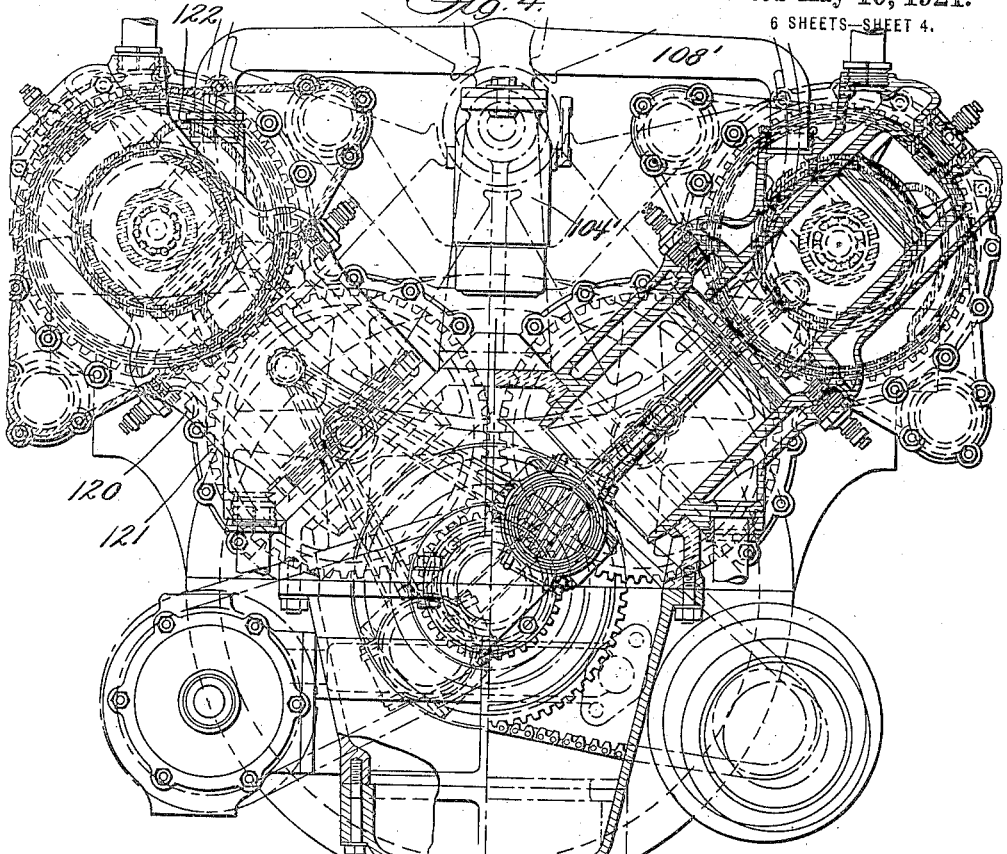
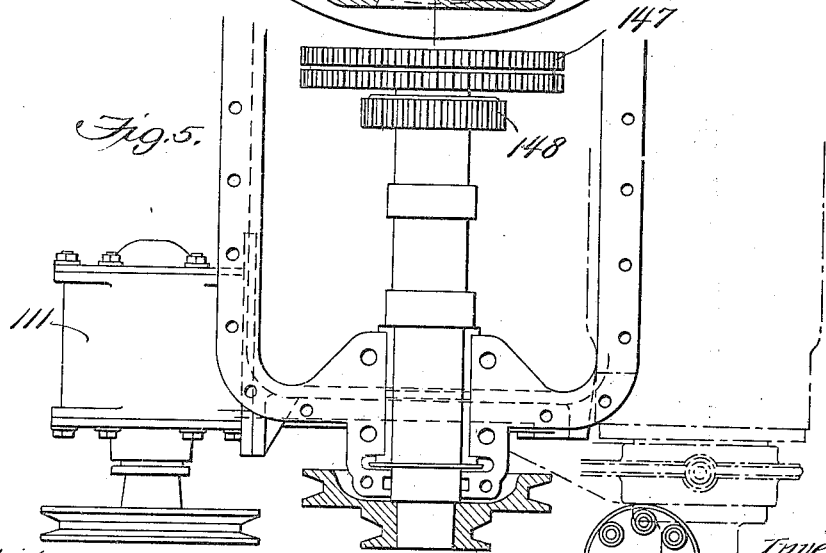

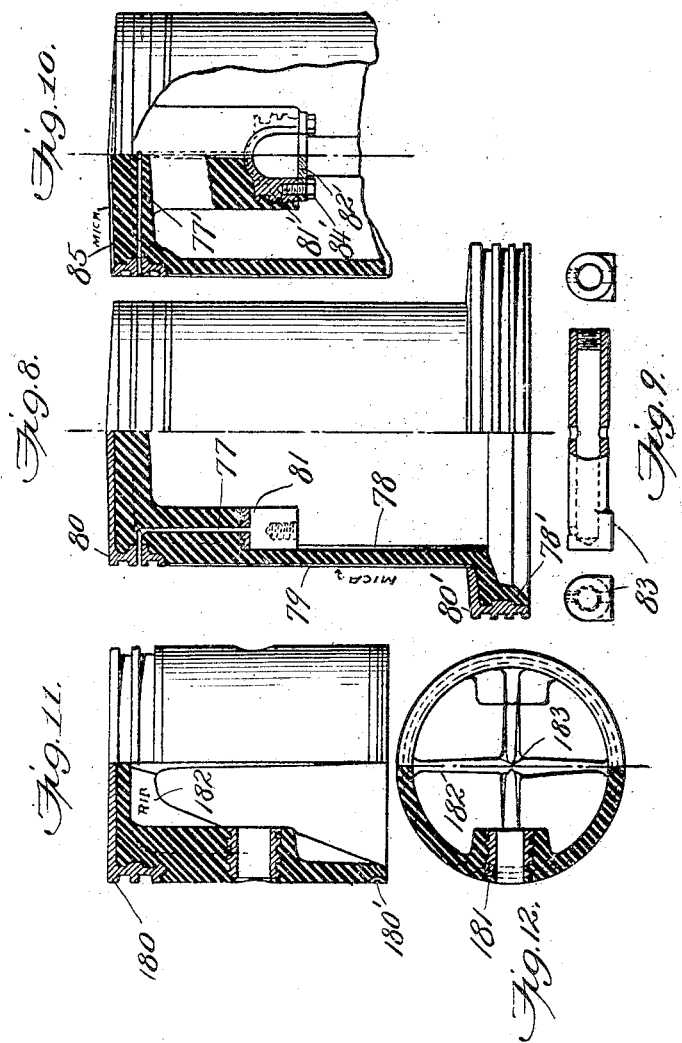

UNITED STATES PATENT OFFICE.

CHARLES DE LUKACSEVICS, OF NEW YORK, N. Y.

INTERNAL-COMBUSTION ENGINE.

1,377,898.　　　　　　Specification of Letters Patent.　　Patented May 10, 1921.

Application filed April 30, 1920.　Serial No. 377,915.

*To all whom it may concern:*

Be it known that I, CHARLES DE LUKACSEVICS, a citizen of the United States, residing at New York, in the county of New York and State of New York, have invented new and useful Improvements in Internal-Combustion Engines, of which the following is a specification.

This invention relates to internal combustion engines of the type which employs stepped pistons operating in concentric or tandem cylinders.

An object of my invention is to construct a four cylinder engine of the above mentioned type having a single valve means for controlling the inlet and exhaust ports of the different cylinders.

My invention permits a single valve drive from the crank shaft, gives a compact arrangement of parts, greatly reduces the weight as compared to other engines of like power, permits the use of just two main bearings spaced a short distance apart, insures very long life to the engine, eliminates all intricate and troublesome parts and provides easy access as well as a convenient arrangement for the location of oil and water pumps for lubricating and cooling purposes and a very simple arrangement for starting and generating systems.

Other objects of my invention relating to the symmetrical arrangement of the exhaust accommodations, improved piston construction, novel combinations, and improved details of construction will become apparent on reference to the following description:—

In the accompanying drawings:

Figure 1 is a side elevation partly and in part a vertical section taken at the line A—A of Fig. 2.

Fig. 2 is a sectional view on the line B—B of Fig. 1 on the right hand side, while the left hand side shows a front elevation disclosing a clear view of the valve housing, the front cylinder block being removed. The lower part of the figure shows a direct front elevation on the left and sectional view on the right.

Fig. 3 is a combined illustration of a plan view on the right, section at D—E of Fig. 1 on the left, section at C—C of Fig. 2 and section at D—D of Fig. 1 which is taken transversely across the cylinder.

Fig. 4 is a side elevation on the left and longitudinal sectional view on the right illustrating the application of my invention to a V-type engine.

Fig. 5 is a partial plan view of the crankcase and main drive shaft.

Fig. 6 is an elevation of my improved and novel valve, partially in section along the line B—B of Fig. 7.

Fig. 7 is a sectional view of said valve at the line A—A of Fig. 6.

Fig. 8 is a part elevation and part sectional view of an improved stepped piston construction.

Fig. 9 is a detail view of the wrist pin used with the stepped piston.

Fig. 10 is a partial elevation and sectional view of a modified form of piston.

Fig. 11 is a partial elevation and sectional view showing the application of this form of piston construction to single pistons.

Fig. 12 is a partial transverse section and bottom plan view of the piston illustrated in Fig. 11.

Referring to Fig. 1, the numerals 10 and 11 designate cylinder blocks, each block being preferably a unitary casting with upper and lower portions of different diameters. The upper portion of each block is formed with a cylinder 12, and the lower portions with a cylinder 13 concentric with, but of larger diameter than the upper cylinder. Each block is also provided with a water jacket 14 which extends throughout the length of the cylinders and through the cylinder heads. The upper and lower cylindrical block portions are formed with suitable apertures for receiving spark plugs 15 and 16, the contact points of which extend into the respective combustion chambers 17 and 18. Each lower cylinder 13 is prolonged by an extension 19 on the cylinder block which is adapted to fit within a hole formed in the upper section 20 of a crank case for the purpose of locating the cylinder blocks with relation to the crankcase and crank shaft journaled therein. Fastening devices 21 removably secure the cylinder blocks to the crank case. The bottom of the crank case is closed by a cover 22 adapted to act as a sump for lubricating oil and detachably secured to the crank case by bolts 23. An oil screen or strainer 27 is mounted between the crank case and cover and is intermediately supported by lugs 28 upstanding from the cover and fastening devices 29'. The water outlet pipe connections for the water jacket of each cylinder are shown at 24, said pipe connections communicating with an outlet tube 25 which is connected to the top header of a radiator. The connections between the water pump 29 and the water jackets are illustrated at 30 (Fig. 2). The cylinder block 11 is formed with a boss or protuberance 31 for receiving a stub shaft 32 having rotatably mounted thereon the usual fan 33 and fan pulley 34.

According to my invention the cylinder blocks are arranged close together and the crank case is correspondingly of relatively small longitudinal dimension. A front bearing 35 and rear bearing 36 are provided in the crank case, the front bearing being reinforced by ribs 37 and the rear bearings by ribs 38 which latter merge into an annular extension of the crank case that forms a housing 39 for the fly-wheel 40. The bearings 35 and 36 are lined with suitable bearing liners, (preferably Kelly metal) 41 and 42 that terminate in flanges adapted to engage the bearings of the crank case and also limit the longitudinal movements of the crank shaft 43 mounted on said bearings by engaging the arms 44, 45 of the cranks of said crank shaft. The cranks of the crank shaft are placed 180° apart and are connected with piston rods 46 in the usual manner. Secured to the crank shaft at points located between the crank arms are the generator and starter sprocket 47 and the valve drive sprocket 48. The sprocket 48 transmits motion to the valve sprocket 49 of my unitary valve structure by means of a Morse chain and the sprocket 47 is connected to the sprocket 50 of the generator and starter unit which is supported at the left side of the crank case (Fig. 2) by means of front and rear brackets 52, 53 respectively, having mounted therein an adjustable eccentric bearing 54 by means of which the drive chain connecting the sprockets 47 and 50 may be adjusted. An oil pump 55 having an adjustable stroke and a timer and distributer mechanism 56, 57 are mounted on the generator casing and driven from the generator shaft through suitable gearing.

The oil pump 55 is adapted to draw oil from the oil sump in the cover 22 through a suitable connection (not shown) and force the same through outlet connections (not shown) to the annular oil supply grooves 58, 59 formed in the front and rear crank case bearings respectively. It will be noted that the crank shaft main bearings are transversely bored at 60 and 61 in alinement with said oil supply grooves. The main bearings are also bored longitudinally at 62, 63, and these passages communicate with oil passages 64 in the crank arms 44, 45 and with passages 65 formed in the crank pins.

The crank pins are transversely bored as at 66 so as to provide a continuous passage whereby the oil may reach the connecting rod bearings. The connecting rods are also formed with a port 67 which is in communication with a tube 68 secured to the connecting rod for conducting lubricant to the piston wrist pin and piston in a manner which is hereinafter described. The front and rear bearings 35, 36 of the crank are extended and enlarged for housing annular recesses 69, 70 respectively. Disks 71, 72 are located in these recesses and secured to the crank shaft adjacent the main crank shaft bearings for the purpose of centrifugally throwing the oil that passes through said bearing into the recesses 69, 70 from whence it can flow back to the crank case through passages 73, 74. A pulley 34' for receiving and driving a fan belt is secured to the forward end of the crank shaft and the fly-wheel 40 is secured to a flange 75 formed on the rear end of the crank shaft.

Each wrist pin 76 is hollow and the interior communicates through a central transverse aperture with the oil tube 68 and through an aperture near each end with oil ducts 77 of the piston which lead at their upper ends to the exterior surface of the piston 78, 79 (Figs. 1, 8, 12). The body of each piston is preferably of bakelite or the like having its side walls covered with sheet mica embedded into the bakelite when molded, for the purpose of preventing the excessive overheating of the bakelite and also providing an anti-friction surface, since mica possesses lubricating properties. The top and adjacent side of each piston 78, 78' is provided with metal (preferably cast iron) inserts 80, 80' for receiving the piston rings. The importance of this construction lies in the fact that the cast iron inserts yield to heat conditions in the same manner as the cylinder, and the bakelite harmonizes or yields so that this heat relation may be established. For the reception of the wrist pin, metal inserts (preferably steel) 81 are embedded in the bakelite body at the proper places. The wrist pin is held from reciprocation in the inserts 81 by means of the straps 82 which engage the flat portion of the head 83, formed integral with the wrist pin at one end thereof, and the flat portion of a head 83' secured to the other end of its wrist pin, said straps being held in place by bolts 84 detachably secured to suitable bosses formed on the interior of opposite walls of the piston.

In Fig. 10 a modified form is shown in which the top of the piston is also covered with a layer of mica 85 and the piston is formed with a central projection having a metal insert 81' for receiving a wrist pin, and straps 82' and bolts 84' secure the wrist pins in position. Oil ducts 77' lead from an aperture in the metal inserts 81′ to the exterior walls of the cylinder.

In Figs. 11 and 12 are further modifications of my invention showing the bakelite construction applied to a single piston having metal inserts 180, 180′ for receiving the piston rings and inserts 181 for receiving the wrist pins. These figures also show reinforcing ribs 182 which extend from the side walls and piston head and intersect below the piston head at 183.

The cylinder blocks 10, 11 on adjacent sides are formed with projecting flanges adapted to house my improved valve and valve gear and secured together by fastening devices 90. The adjacent sides of the cylinder blocks are also recessed in transverse alinement for receiving the oppositely projecting hubs 91 of a sprocket wheel having the web portion 92 terminating in an annular flange 93, having the sprocket 49 formed thereon. My improved valve is formed in two sections, both of which are secured to the sprocket 49, by means of bolts passing through alining apertures in the web portion 92. Each valve section is annular and rotatably mounted in the annular recesses on the engaging surfaces 95, 96 and 97, which rotate in gas-tight relation with the corresponding receiving surfaces 95′, 96′ and 97′ of each cylinder block. Each valve section is also provided with a gas inlet chamber 98 which extends nearly 180° around the inner annular surface of each valve section, and communicates with a lateral gas inlet port 99 of smaller extent. An annular exhaust chamber 100, extending around the valve communicates with the cylinder ports through exhaust port 101. The inlet chambers by this construction are in communication with the gas conduits 102 formed on the adjacent sides of the cylinders, exterior of the water jacket, each conduit connecting with one branch of a gas inlet manifold 103 leading from a carbureter 104. It will be noted that the explosive mixture before entering the cylinders is subjected to the heat of the water in the jacket of the engine and then to the heat of the exhaust gases transmitted through the dividing wall 105 of the valve, as the exhaust gases pass through the annular chamber 100 to the exhaust housing 108. This latter heat is considerable since one of the cylinders, due to the angular extent of the exhaust ports is almost continually exhausting through the valve, thus insuring complete vaporization of the liquid fuel.

It will be understood that both sections of the valve are supported entirely on the sprocket wheel which is journaled in the roller bearings 106, so that little if any wear is placed upon the gas tight surfaces 95, 96 and 97. A packing ring 107 is arranged in an annular groove in the web 92 for the purpose of confining the lubricant applied to the roller bearings 106 through connection 109 and oil ducts 110.

Fig. 4 illustrates the application of my invention to a V-type engine. In this case the carbureter 104′ is located between the inclined cylinders in proximity to the exhaust housings 108′ so that the fuel contained therein is subject to the heat from these exhaust housings.

Fig. 5 illustrates the starter sprocket 147 and valve gear 148 of this type of engine. To the forward end of the crank shaft in this case is secured a double pulley having a sheave 134 for driving a cooling fan and a water pump 111. In this case gearing is used to drive the valve instead of chain and sprockets but these are intended for alternative structures which may be selected by the designer.

My improved engine is supported at the front bearing on a frame member 112. Oil may be supplied to the crank case through breather tube 113.

In operation the explosive mixture is supplied to each cylinder during its respective suction stroke through the inlet port of the corresponding valve section, the valve being driven from the crank shaft in a 1:2 relation so as to give a four-cycle operation. The incoming gases are heated by the water in the cooling jackets and from the exhaust gases which pass through the valve after the engine is in operation. Assuming that the upper and lower cylinders of the forward block are numbered 1, 2, and like cylinders of the rear block 3 and 4 then the suction stroke of No. 1 will be the firing stroke of No. 2, the compression stroke of No. 3 and the exhaust stroke of No. 4 giving a firing order of 1, 4, 2, 3. My invention affords a simplified valve construction for engines of this type and gives compact and simplified construction, efficiency of operation and proper lubrication for engines of the stepped piston type.

Although reference is made in this specification to a four cylinder engine it will be understood that it is intended to cover any multiplications of this number, the four cylinder arrangement being considered a symmetrical unit. Thus, the V-type engine shown in Fig. 4 is composed of two four cylinder units 120 angularly disposed with relation to the crank shaft and each unit controlled by an annular valve 122, both valves being actuated from valve gear 148 of the crank shaft through duplicate gearing 121.

Other modifications and variations of structure may occur to those skilled in the art to which this invention appertains but all such changes are within the purview of my invention if within the spirit or scope of the appended claims.

In the claims:

1. In an internal combustion engine, adjacent cylinder blocks each having concentric cylinders of different diameters, a stepped piston in said concentric cylinders and a single valve means interposed between said cylinder blocks and controlling all of said cylinders.

2. In an internal combustion engine, a crank shaft, adjacent cylinder blocks provided with alining bearings having their axes in the same plane as the longitudinal axis of said shaft, each of said blocks having concentric cylinders of different diameters, a stepped piston in said concentric cylinders connected to said crank shaft, and a single valve means located between said cylinder blocks controlling all of said cylinders, said valve means including journals extending parallel to the crank shaft and mounted in said bearings.

3. In an internal combustion engine, adjacent cylinder blocks each having concentric cylinders of different diameters, a stepped piston in said concentric cylinders, a two crank shaft having cranks arranged 180° apart, connecting rods between said cranks and pistons, a single valve means controlling all of said cylinders, and a gear secured to the shaft between said cranks for driving said valve means.

4. In an internal combustion engine, a crank shaft, adjacent cylinder blocks each having concentric cylinders of different diameters, each of said cylinders having a combined inlet and exhaust port, a stepped piston in said concentric cylinders connected to said crank shaft, an annular valve located between said cylinders having inlet and exhaust ports adapted to control the combined inlet and exhaust ports of all of said cylinders and driving means interposed between said cylinder blocks for operatively connecting said crank shaft and valve.

5. In a four cylinder internal combustion engine, two adjacent cylinder blocks having alining bearings in the adjacent sides thereof, a valve journaled in said bearings for controlling the admission of combustible mixture and the escape of exhaust gases from the cylinders, means for supplying lubricant to said bearings and packing rings carried by said valve for confining the lubricant to said bearings.

6. In a four cylinder internal combustion engine, two adjacent cylinder blocks having water jackets, and a single valve means located therebetween having ports for controlling the inlet and exhaust of the cylinders, a gas inlet passage formed in each cylinder block adjacent the water jacket and communicating with the inlet port of said valve, whereby the valve structure is subjected to the heat of the exhaust gases passing therethrough and incoming gases are subject to the heat of said exhaust gases and the heat of the water jacket before entering the cylinders of the engines.

7. In an internal combustion engine, stationary concentric cylinders of different diameters, a stepped piston in said concentric cylinders having a piston ring retaining insert, a wrist pin for said piston, said piston, insert, and wrist pin being formed with communicating oil passages leading to the side wall of the piston, a crank shaft having an oil duct therein, a connecting rod between said crank shaft and wrist pin, an oil tube secured to said connecting rod and affording communication between said duct and passage and means for forcing lubricating oil through said crank shaft, tube and passage to lubricate the side walls of the stepped piston.

In testimony whereof I have hereunto set my hand in presence of two subscribing witnesses.

CHARLES DE LUKACSEVICS.

Witnesses:
 HARRIET ROBINSON,
 JOHN WOOD.